US010245928B1

(12) United States Patent
Facchinello

(10) Patent No.: US 10,245,928 B1
(45) Date of Patent: Apr. 2, 2019

(54) TONNEAU COVER WITH HIDDEN HINGES

(71) Applicant: Tectum Holdings Inc., Ann Arbor, MI (US)

(72) Inventor: Jerome Facchinello, Grand Blanc, MI (US)

(73) Assignee: TECTUM HOLDINGS, INC., Ann Arbor, MI (US)

( * ) Notice: Subject to any disclaimer, the term of this patent is extended or adjusted under 35 U.S.C. 154(b) by 0 days.

(21) Appl. No.: 15/719,891

(22) Filed: Sep. 29, 2017

(51) Int. Cl.
*B60J 7/14* (2006.01)
*B60P 7/02* (2006.01)
*E05D 3/02* (2006.01)
*E05D 7/04* (2006.01)

(52) U.S. Cl.
CPC .............. *B60J 7/141* (2013.01); *E05D 3/02* (2013.01); *E05D 7/04* (2013.01); *E05D 2007/0469* (2013.01); *E05D 2007/0476* (2013.01); *E05Y 2900/53* (2013.01)

(58) Field of Classification Search
CPC ......... B60J 7/141; B60P 7/02; E05D 2007/04; E05D 2007/0469; E05D 2007/0476; E05D 2007/0072; E05D 3/02
USPC ............. 296/100.03, 100.06, 100.08, 100.09
See application file for complete search history.

(56) References Cited

U.S. PATENT DOCUMENTS

| 3,146,824 | A | 9/1964 | Veilleux |
| 4,313,636 | A | 2/1982 | Deeds |
| 4,419,954 | A | 12/1983 | Buckley |
| 4,563,034 | A | 1/1986 | Lamb |
| 4,786,099 | A | 11/1988 | Mount |
| 4,889,381 | A | 12/1989 | Tamblyn |
| 5,184,564 | A | 2/1993 | Robbins et al. |
| 5,251,950 | A | 10/1993 | Bernardo |
| 5,427,428 | A | 6/1995 | Ericson et al. |
| 5,636,893 | A | 6/1997 | Wheatley et al. |
| 5,653,491 | A | 8/1997 | Steffens et al. |
| 5,758,921 | A | 6/1998 | Hall |
| 6,053,556 | A | 4/2000 | Webb |
| 6,095,588 | A | 8/2000 | Rodosta |
| 6,352,296 | B1 | 3/2002 | Kooiker |
| 7,047,576 | B2 | 5/2006 | Tavivian |
| 7,188,888 | B2 | 3/2007 | Wheatley et al. |

(Continued)

FOREIGN PATENT DOCUMENTS

WO 2003/006889 A2 1/2003

*Primary Examiner* — Gregory A Blankenship
(74) *Attorney, Agent, or Firm* — The Dobrusin Law Firm P.C.; Daniel P. Aleksynas

(57) ABSTRACT

A foldable tonneau system comprising: (a) a plurality of tonneau sections; (b) one or more hinges connecting two or more of the plurality of tonneau sections together, the one or more hinges each including: (i) a hinge housing connected to each of the two or more of the plurality of tonneau sections with each of the hinge housings being connected a different one of the plurality of tonneau sections, and (ii) a slide box located at least partially within and movably connected to each of the hinge housings; wherein each of the slide boxes are longitudinally movable relative to the hinge housings so that the one or more hinges are longitudinally extendable, and the hinge housings are rotationally movable relative to each other so that one of the plurality of tonneau sections is rotationally movable to a location above a second one of the plurality of tonneau sections.

20 Claims, 11 Drawing Sheets

(56) References Cited

U.S. PATENT DOCUMENTS

| | | | |
|---|---|---|---|
| 7,252,322 B2 | 8/2007 | Rusu | |
| 7,258,387 B2 | 8/2007 | Weldy | |
| 7,404,586 B2 | 7/2008 | Seiberling | |
| 7,484,788 B2 | 2/2009 | Calder et al. | |
| 7,828,361 B1 | 11/2010 | Spencer | |
| 8,061,758 B2 | 11/2011 | Maimin et al. | |
| 8,262,148 B2 | 9/2012 | Rusher et al. | |
| 8,348,328 B2 | 1/2013 | Walser et al. | |
| 8,641,124 B1 * | 2/2014 | Yue | B60J 7/141 296/100.09 |
| 8,807,625 B2 | 8/2014 | Garska | |
| 8,814,249 B2 | 8/2014 | Rossi | |
| 8,881,464 B1 | 11/2014 | Huckeba | |
| 8,960,764 B2 | 2/2015 | Spencer | |
| 8,960,765 B2 | 2/2015 | Facchinello et al. | |
| 9,120,413 B2 | 9/2015 | Fink | |
| 9,211,834 B2 | 12/2015 | Knox | |
| 9,290,122 B2 | 3/2016 | Spencer | |
| 9,533,555 B2 | 1/2017 | Facchinello et al. | |
| 9,545,835 B2 | 1/2017 | Facchinello et al. | |
| 9,630,479 B2 | 4/2017 | Facchinello et al. | |
| 9,815,358 B1 | 11/2017 | Quintus | |
| 9,855,828 B1 * | 1/2018 | Yang | B60J 7/141 |
| 2004/0245799 A1 | 12/2004 | Rusu | |
| 2006/0267370 A1 * | 11/2006 | Wheatley | B60J 7/104 296/100.15 |
| 2007/0035151 A1 | 2/2007 | Rusu | |
| 2007/0108792 A1 | 5/2007 | Weldy | |
| 2007/0210609 A1 | 9/2007 | Maimin et al. | |
| 2008/0100088 A1 | 5/2008 | Calder et al. | |
| 2013/0015678 A1 | 1/2013 | Williamson et al. | |
| 2013/0341956 A1 | 12/2013 | Garska | |
| 2014/0152046 A1 | 6/2014 | Facchinello et al. | |
| 2015/0061315 A1 | 3/2015 | Facchinello et al. | |
| 2016/0096421 A1 | 4/2016 | Facchinello et al. | |
| 2016/0096423 A1 | 4/2016 | Facchinello et al. | |
| 2016/0176448 A1 | 6/2016 | Germano et al. | |
| 2016/0200376 A1 * | 7/2016 | Kerr, III | B60P 7/02 296/100.07 |
| 2016/0288691 A1 | 10/2016 | Aubrey et al. | |
| 2016/0288720 A1 | 10/2016 | Huebner et al. | |
| 2017/0001499 A1 | 1/2017 | Facchinello et al. | |
| 2017/0066311 A1 | 3/2017 | Facchinello et al. | |
| 2017/0151864 A1 | 6/2017 | Facchinello et al. | |
| 2018/0118004 A1 * | 5/2018 | Schmeichel | B60J 7/198 |
| 2018/0147926 A1 * | 5/2018 | Shi | B60J 7/141 |

* cited by examiner

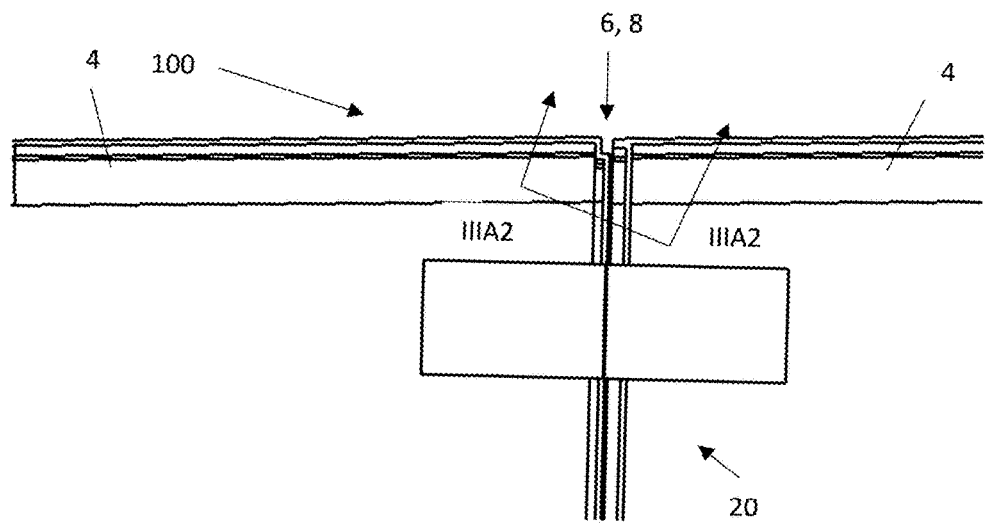
Fig. 3A1
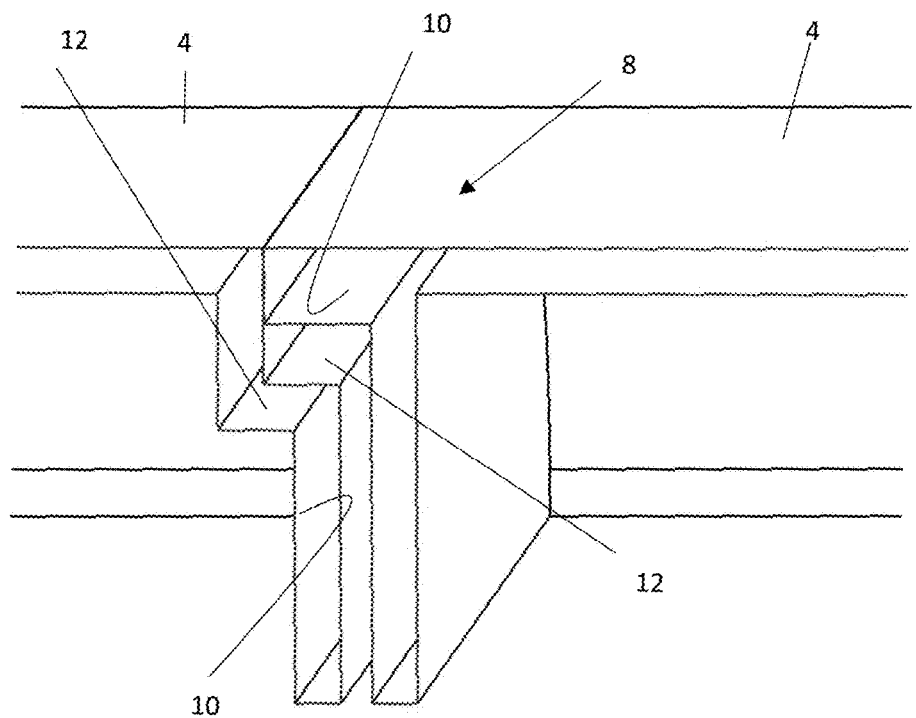
Fig. 3A2

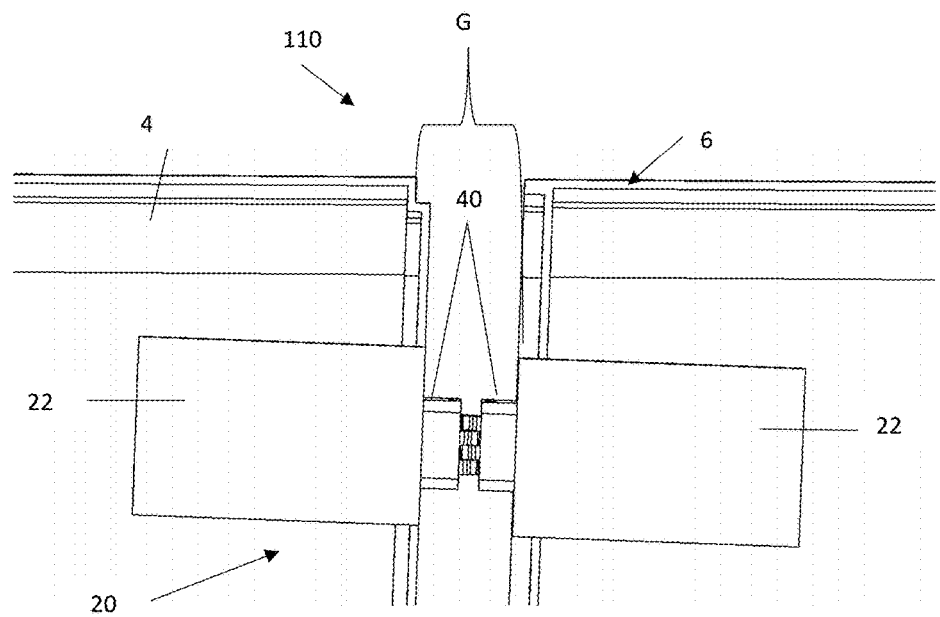
Fig. 3B1
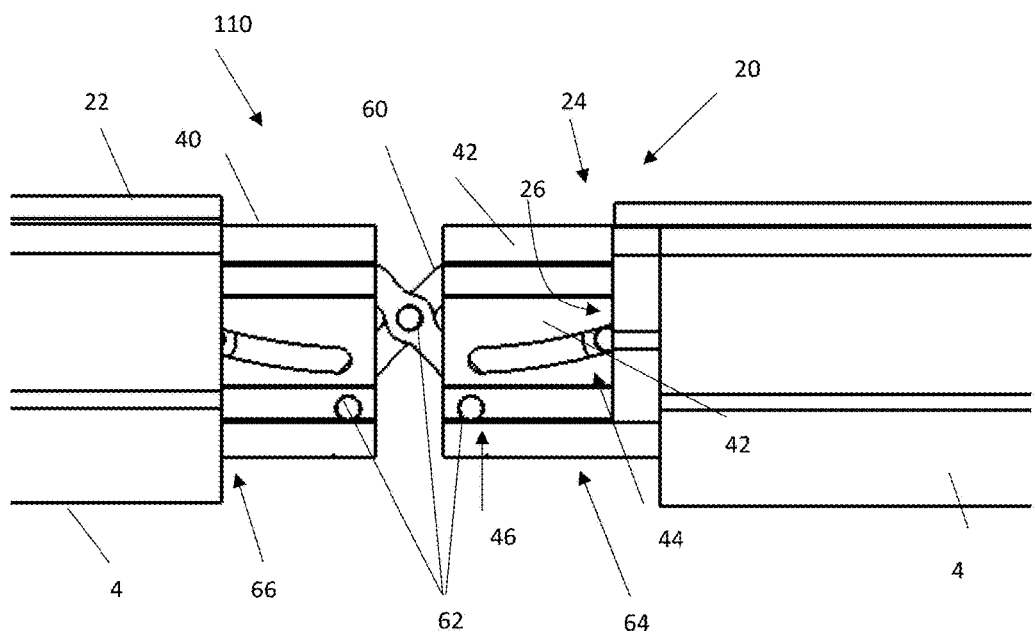
Fig. 3B2

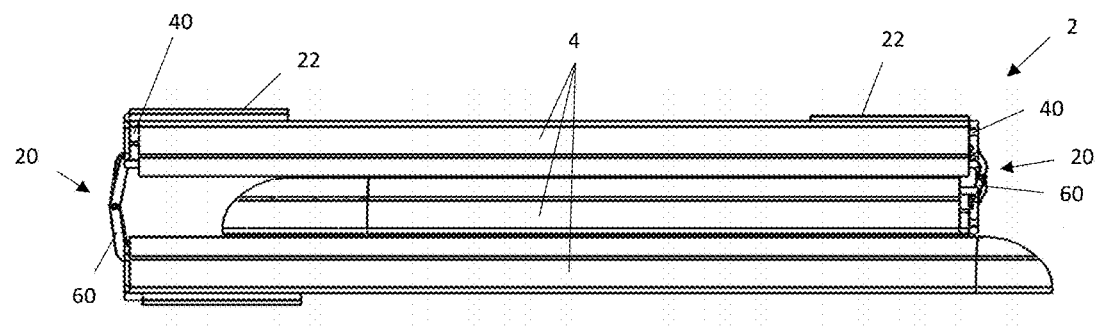
Fig. 4A
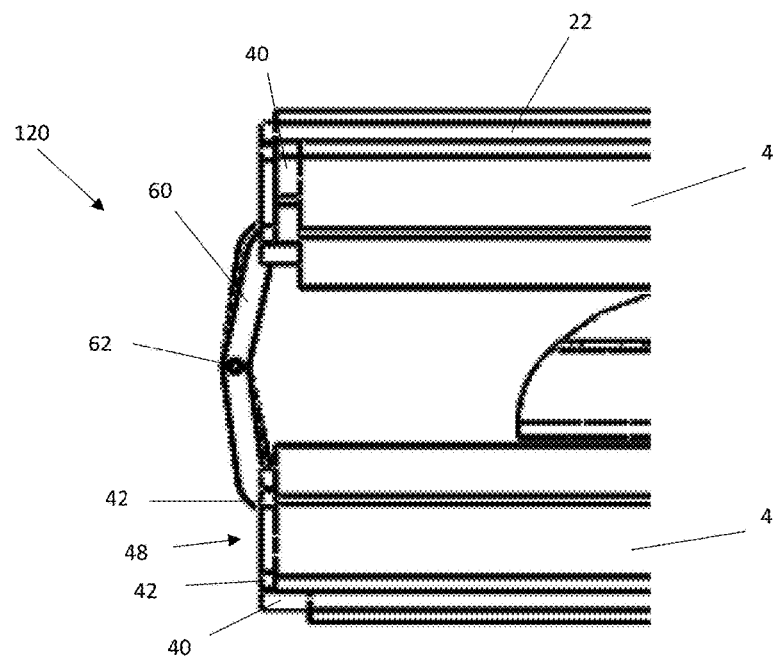
Fig. 4A1

TONNEAU COVER WITH HIDDEN HINGES

FIELD

The present teachings relate to a foldable tonneau system with a plurality of tonneau sections that are foldable relative to each other by a hinge and more specifically a hinge that is hidden from view when the tonneau system is in a closed position.

BACKGROUND

Tonneau systems cover an open area of a vehicle and generally cover an open area of a pick-up truck (i.e., a bed). Multiple different types of tonneau systems are available, however, many of these systems have an exterior where joints, hinges, or an elastomeric hinges are visible. These joints, hinges, or elastomeric hinges may prevent all of the panels from being painted or the tonneau system from having a continuous exterior surface such that the tonneau system may not have a clean exterior surface. These systems include a plurality of panels that are folded one on top of another and the panels rotate about the hinges.

Examples of tonneau systems are found in U.S. Pat. Nos. 3,146,824; 5,251,950; 7,484,788; 8,960,765; 9,211,834 all of which are expressly incorporated herein by reference for all purposes. It would be desirable to have hinge that is entirely located below the panels of the tonneau system. What is needed is a hinge that assists in locking two panels together so that fluid is prevents from extending between the two panels. It would be desirable to have a hinge that prevents rotation of one panel relative to another panel when the panels are in a closed position. What is needed is a hinge that creates a gap and prevents one panel from coming into contact with another panel when the panels are in the stored position.

SUMMARY

The present teachings seek to help solve one or more of the problems/issues disclosed above. The present teachings are particularly directed to hidden hinges that are located on an underside of a tonneau system. The present teachings are directed to a hinge that supports at least one end of a tonneau section.

Accordingly, pursuant to one aspect of the present teachings provide a foldable tonneau system comprising: (a) a plurality of tonneau sections; (b) one or more hinges connecting two or more of the plurality of tonneau sections together, the one or more hinges each including: (i) a hinge housing connected to each of the two or more of the plurality of tonneau sections with each of the hinge housings being connected a different one of the plurality of tonneau sections, and (ii) a slide box located at least partially within and movably connected to each of the hinge housings; wherein each of the slide boxes are longitudinally movable relative to the hinge housings so that the one or more hinges are longitudinally extendable, and the hinge housings are rotationally movable relative to each other so that one of the plurality of tonneau sections is rotationally movable to a location above (i.e., at a location vertically higher than another section), over (i.e., at a location so that one is located directly on top of another section), or both a second one of the plurality of tonneau sections.

The present teachings provide: a foldable tonneau system comprising: (a) two or more tonneau sections that when in a closed position are substantially entirely located within a single plane and are end to end, wherein a first end of a first of the two or more tonneau sections includes a portion of an anti-rotation joint and a second end of a second of the two or more tonneau sections includes a portion of an anti-rotation joint and when the first end and the second end are connected together in the closed position, the anti-rotation joint is complete and prevents movement of the first of the two or more tonneau section and the second of the two or more tonneau sections out of the single plane; and (b) one or more hinges that connect the two or more tonneau sections together; wherein the one or more hinges are longitudinally movable from the closed position to an extended position where the first end and the second end are longitudinally spaced apart so that the first of the two or more tonneau section and the second of the two or more tonneau sections are movable relative to each other out of the single plane.

The present teachings provide: a method comprising: (a) moving a first tonneau section away from a second tonneau section so that a gap is formed between the first tonneau section and the second tonneau section; and (b) rotating the first tonneau section relative to the second tonneau section so that the first tonneau section is rotated out of a plane of the second tonneau section.

The present teachings provide a hinge that is entirely located below the panels of the tonneau system. The present teachings provide a hinge that assists in locking two panels together so that fluid is prevents from extending between the two panels. The present teachings provide a hinge that prevents rotation of one panel relative to another panel when the panels are in a closed position. The present teachings provide a hinge that creates a gap and prevents one panel from coming into contact with another panel when the panels are in the stored position.

DESCRIPTION OF THE DRAWINGS

FIG. 3A1 is a close-up view of a hinge of FIG. 2;

FIG. 3A2 is a cross-sectional view of an anti-rotation joint of FIG. 3A1;

FIG. 3B1 is a plan view of a hinge in an extended position;

FIG. 3B2 is a side view of the hinge of FIG. 3B1

FIG. 4A is a side view of a tonneau system in a stored position;

FIG. 4A1 is a close-up view of a hinge of FIG. 4A;

DETAILED DESCRIPTION

Figure 1:
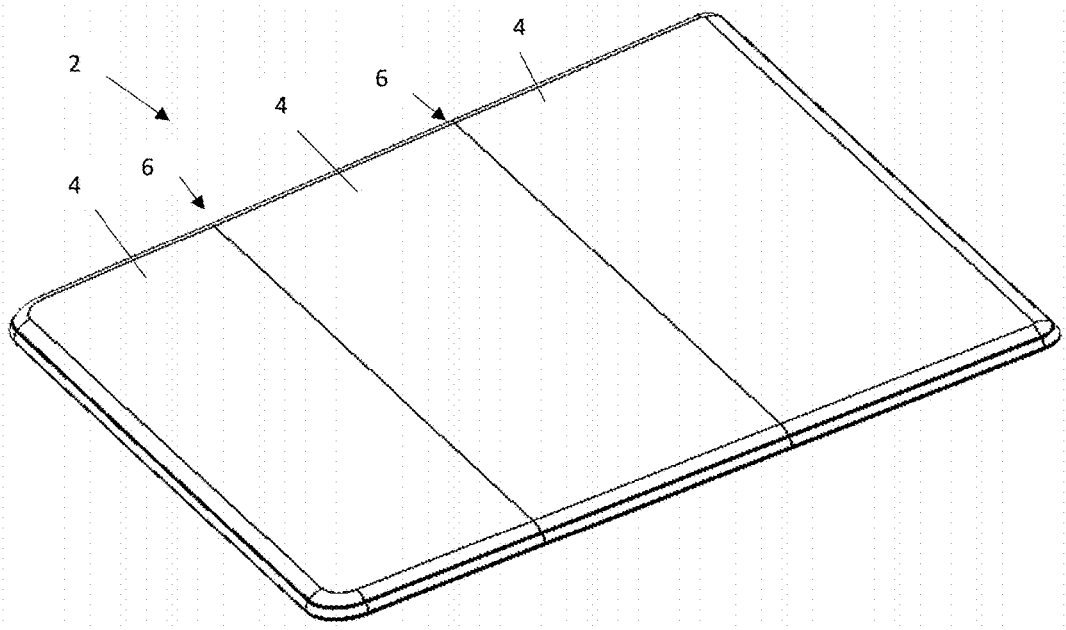
FIG. 1 is a top perspective view of a tonneau system in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The foldable tonneau system (tonneau system) functions to cover an open area and prevent fluid, debris, dirt, or a combination thereof form entering the open area (e.g., a bed of a pick-up truck, and hereinafter "bed"). The tonneau system may function to lock a bed so that items may be stored within the bed. The tonneau system may be collapsible so that items may be placed within the bed without interference from the tonneau system. The tonneau system may fold upon itself to expose the bed. The tonneau system may include one or more tonneau sections and preferably a plurality of tonneau sections.

The tonneau sections (i.e., section) function to connect together to create one contiguous surface. The tonneau sections may lock together. The tonneau sections may be longitudinally movable, rotationally movable, or both relative to other tonneau sections. The tonneau sections when in a closed position may prevent fluid, debris, dirt, or a combination thereof from entering a bed. The tonneau sections may be separate pieces. The tonneau sections may be connected together by a hinge, an outer covering, or both. The tonneau sections may be connected together by a cover that is flexible so that one tonneau section is movable relative to another tonneau section. The outer covering may be flexible so that one tonneau section may be moved relative to another tonneau section. The outer covering may prevent one tonneau section from being longitudinally moved relative to another tonneau section. The tonneau sections may include a frame. The tonneau sections may include one or more frame members. The one or more frame members may extend along a length of each section, form a perimeter of the foldable tonneau system, or both. The tonneau sections may be free of a frame. The tonneau sections may be made of a sheet moulding compound. The tonneau sections may be made of a polymer, foam, metal, aluminum, titanium, or a combination thereof. The outer covering may have some elastomeric properties that allow one tonneau section to be longitudinally moved relative to another tonneau section. The outer covering may be a spacer that is located between each tonneau section and moves with each tonneau section. The outer covering may prevent water from penetrating between the tonneau sections in the closed position, extended position, stored position, or a combination thereof. The cover may extend over more than one tonneau section. The cover may extend from end of a tonneau section to another end of a tonneau section sot that a gap between the tonneau sections are covered. The tonneau sections may be rotatable about a hinge pivot.

The hinge pivot may function to permit one tonneau section to rotate relative to another tonneau section. The hinge pivot may be a point (or line) that one tonneau section rotates about relative to another tonneau section. The hinge pivot may be an axis. The hinge pivot may extend from a first axis to a second axis so that the hinge pivot has a generally "U" shape or a generally "C" shape. The hinge pivot may define a geometry that the tonneau sections move about so that one section may move above, over, or both another section. The hinge pivot may allow for movement about a longitude (e.g., length of a bed) of one or more tonneau sections, rotation of one tonneau section relative to another tonneau section, or both. The one or more hinge pivots may work with or include an anti-rotation joint.

The anti-rotation joint functions to prevent rotational movement of one tonneau section relative to another tonneau section when the tonneau sections are in close proximity to each other (e.g., about 5 mm or less, about 3 mm or less, or about 1 mm or less) or in contact with each other. The anti-rotation joints may be male, female, or both. One anti-rotation joint may be complementary in shape to another anti-rotation joint. Preferably, one anti-rotation joint is male and one anti-rotation joint is female. Each of two sections may include a anti-rotation joint and the anti-rotation joints may work in conjunction with each other. One anti-rotation joint may overlap an adjacent anti-rotation joint. The anti-rotation joint may include two halves (or portions) that complete the anti-rotation joint. For example, a first tonneau section may include a first portion of an anti-rotation joint at a first end and a second tonneau section may include a second portion of an anti-rotation joint at a second end that mates with the first portion to form an anti-rotation joint. The anti-rotation joints may be located such that when the tonneau sections are in the closed position the anti-rotation joint prevents the sections from moving relative to each other. When the tonneau sections are in a closed position the anti-rotation joints may prevent the tonneau sections from rotating relative to each other. For example, when the tonneau sections are in a closed position a first tonneau section may rotate into contact with a second tonneau section to prevent rotation. The anti-rotation joints may extend a full width of each of the tonneau sections (e.g., from a passenger side to a driver side of a bed). The anti-rotation joints may extend along the hinge pivot. The anti-rotation joint may be "Z" shaped, have a "U" shape, "L" shaped, or a combination thereof. The anti-rotation joint may be a rabbet joint. The anti-rotation joint may assist in moving fluids towards the edges when the tonneau sections are in the closed position, the extended position, or both. The anti-rotation joints may be located in a center of a tonneau section, on the edges of a tonneau section, intermittently along one or more tonneau sections, continually across a tonneau section, or a combination thereof. The anti-rotation joint may be a seal between two tonneau sections. The anti-rotation joint may receive one or more seals so that fluid does not extend into the bed. The anti-rotation joint may act as a second layer that prevents water penetration into the bed. The anti-rotation joints may contact each other and prevent fluids from extending beyond the anti-rotation joint. The anti-rotation joints may include one or more cheeks, one or more shoulders, or both.

The one or more cheeks may function to contact a shoulder and prevent rotation of one shoulder relative to another shoulder when the shoulders are in a closed position. The one or more cheeks may extend from a shoulder. The one or more cheeks may extend from a top of a shoulder, a bottom of a shoulder, under a shoulder, or a combination thereof. The one or more cheeks may have a portion that is parallel to a shoulder, a portion that is perpendicular to a shoulder, or both. The one or more check may be generally parallel to a one or more cheeks on an adjacent tonneau section. The one or more cheeks may be generally parallel when two tonneau sections are in a closed position, a stored position, an extended position, or a combination thereof. A face of one cheek may contact a face of an opposing cheek when the tonneau sections are in a closed position. One cheek may rotate away from an opposing check when the sections move from a closed potion to a stored position. The cheeks may terminate at a shoulder.

The shoulders may function to prevent rotation. The shoulder may function to extend over a cheek, over a shoulder that is cut into a cheek, or both. One shoulder may contact another shoulder or a cheek to prevent rotational movement of one tonneau section relative to a second tonneau section when the sections are in a closed position. The one or more shoulders may be a male part or a female part. The female part may cut into a cheek. The male part may project outward from a cheek. The male part may extend over a female part so that when two sections are proximate (i.e., within a length of the male part) the shoulders prevent rotational movement of one section relative to another section. The shoulders may have a length of about 1 mm or more, about 2 mm or more, about 3 mm or more, or about 5 mm or more. The shoulders may have a length of about 5 cm or less, about 3 cm or less, or about 1 cm or less. The shoulders may be moved apart so that one section may rotate relative to another section about the hinge (i.e., at least a length of the shoulder). The sections when moved into an extended position may move one shoulder apart from an adjacent shoulder so that the shoulders may rotate past each other so that one section may be rotated relative to a second section.

The one or more hinges may function to connect two or more tonneau sections together. Preferably, the one or more hinges each connect one tonneau section to a directly adjacent tonneau section. The one or more hinges may be hidden from view when the tonneau sections are in a closed position. The one or more hinges may function to permit one section to rotate relative to another section. One hinge housing on a first tonneau section may move relative to a hinge housing on an adjacent tonneau section. The one or more hinges may prevent one section from contacting a second section, a third section, or both when the sections are in a stored position. The one or more hinges may permit one tonneau section to move longitudinally, rotationally, or both relative to another tonneau section, but to remain connected to the tonneau section. The hinge may permit movement in one or more planes. Preferably, the hinge permits movement in two or more planes in series or in parallel. The one or more hinges may assist in moving a tonneau section from a closed position to an open position. Preferably, the one or more hinges may assist in moving a tonneau section from an open position to a closed position. Even more preferably, the one or more hinges may assist in moving the one or more tonneau sections from a partially rotated position to a closed position. The one or more hinges may prevent the tonneau sections from moving laterally (i.e., side to side). The one or more hinges may extend from one section to another section and vertically support the sections so that a gap is created between the sections. The hinges may be located on a driver side, a passenger side, a middle, one or more side regions, one or more central regions, or a combination thereof. Preferably, at least a first side region and a second side region include a hinge. The hinge may extend between and be connected to two tonneau sections. The hinge may be connected to the tonneau sections by a hinge housing, a slide box, or both.

The one or more hinge housings may function to create a movable connection between the slide box and the tonneau sections. The hinge housing may be a part of the hinge that is connected to the tonneau sections. The hinge housing may form a fixed connection to one of the tonneau sections. Each tonneau section may include a hinge housing. The hinge housing may create a connection with a tonneau section so that all or a portion of the hinge may longitudinally move, rotationally move, or both relative to the tonneau sections. The hinge housing may be a fixed portion of a hinge that is immovable relative to the tonneau sections. The hinge housing be connected to the tonneau sections via a chemical fastener (e.g., adhesive, glue, two part epoxy, one part epoxy); a mechanical fastener (e.g., a rivet, screw, welding, melting, heat steaking); or a combination of both. Each section may be connected to one or more hinge housings. Preferably, each section is connected to a plurality of hinge housings. Each hinge housing may connect to a slide box that is movable relative to the hinge housing. The hinge housing is movable between a closed position and an extended position. Each slide box may be movable along a track within the hinge housing.

The one or more tracks may function to permit a slide box to move longitudinally along a hinge housing. The one or more tracks function to permit one tonneau section to longitudinally move (e.g. form a front of a vehicle bed to a rear of a vehicle bed) relative to another tonneau section. The one or more tracks may be located on a first side, a second side, or both sides of a slide box. The one or more tracks may be located on opposing sides. When more than two tracks are employed the tracks may be generally parallel to each other. The one or more tracks may allow for longitudinal movement but prevent movement in other directions (e.g., lateral movement, vertical movement, or both). The one or more tracks may allow a slide box to move within the hinge housing so that the anti-rotation joints of two adjacent sections are spaced apart. The one or more tracks may include one or more track recesses. Preferably, the one or more tracks include two track recesses with a track projection therebetween.

The one or more track recesses may function to allow a slide box to move laterally. The one or more track recesses may prevent a slide box from being removed from the hinge housing. The one or more track recesses may create a concave area that receives a projection of a slide box. The one or more track recesses may be complementary in shape to a projection of a slide box so that the slide box is longitudinally movable relative to the hinge housing but is prevented from lateral movement, vertical movement, or both by the track recess. The one or more track recesses may receive a portion of a projection of a slide box. The one or more track recesses may extend outward from a midpoint of a hinge housing. The one or more track recesses may extend outward from an opposing wall of the hinge housing. The one or more track recesses may be generally "C" shaped. The one or more track recesses may be located on a top, bottom, center, or a combination thereof of a hinge housing. The track recesses may be located proximate to the tonneau sections (i.e., at a location where the hinge housing connects to the tonneau sections). The track recesses may be located distal from the tonneau section (i.e., at a location distal from the tonneau section). The one or more track recesses may extend outward relative to a track projection. The one or more track recesses may receive a portion of the slide box and the track projection may extend into a portion of the slide box. The track recess and the track projection may be located adjacent to one another.

The one or more track projections may function to restrict lateral movement, vertical movement, or both of a slide box relative to a hinge housing. The one or more track projections may permit longitudinal movement of the slide box relative to the hinge housing. The one or more track projections may extend inward towards a midpoint, an opposing wall, or both. The one or more track projections may be a convex region or a concave region. The one or more track projections may be complementary in shape to a recess in the slide box. The one or more track projections may extend into the recess in the slide box. The one or more track projections may be located between two track recesses. The one or more track projections may extend in an opposing direction to the track recesses. The one or more track projections may be located directly above a connection site of the hinge housing. The one or more track projections may work with the track recesses to align a slide box so that the slide box slides along an axis (e.g., a longitudinal axis). The track projection, the track recess, or both may work with one or more stops to allow a slide box to move but to remain within the hinge housing as the hinge is moved between the closed position and the stored position.

The one or more stops may function to restrict movement of the slide box relative to the hinge housing. The one or more stops may prevent the slide box from being removed from the hinge housing. The one or more stops may lock a slide box within a track. The one or more stops may prevent movement of a slide box relative to a hinge housing without an external force being applied on the one or more sections, the one or more hinges, or both. The one or more stops may prevent further axial movement of the slide box when the slide box is moved to an extended position, a closed position, or both. The one or more stops may be part of the track, the hinge housing, tonneau section, or a combination thereof. Preferably, the one or more stops are part of the track. The one or more stops may be a detent. The one or more stops may be a static piece. The one or more stops may be adjustable. The one or more stops may prevent over rotation of the one or more tonneau sections relative to another tonneau section. The one or more stops may be adjustable to adjust the amount of rotation available between two or more sections. The one or more stops may restrict movement of the one or more hinge arms. The one or more stops may be adjustable to allow for more or less movement of the hinge arms. There may be a plurality of stops. The one or more stops may contact a portion of the slide box to restrict movement of the slide box. The one or more stops may be part of the hinge housing. The one or more stops may contact a movable stop to restrict movement of the slide box.

The one or more movable stops may function to move with the slide box restrict movement of the slide box. The one or more movable stops may work with a stop to restrict movement of the slide box. The one or more movable stops may be free of contact with a stop. The one or more movable stops may be adjustable so that a length of an extended position may be changed. Preferably, the one or more movable stops are static. The one or more movable stops may move with the slide box between the closed position and the stored position. The one or more movable stops may contact a stop at the closed position, at the stored position, or both. The one or more movable stops may be a separate piece that is added to the slide box. The one or more movable stops may be a part of the slide box that is connected to and extends from the slide box. For example, a cut may be made is in the slide box and material may be extended outward from the slide box to create a movable stop. There may be a plurality of movable stops. The one or more movable stops may be located on an outside of the slide box. The one or more movable stops may be located on an inside of the slide box. The one or more movable stops may be a bias member that moves with the slide box and the bias member once moved a predetermined length prevents movement of the slide box.

The one or more bias members may function to move a slide box from a stored position to a closed position, from an extended position to a closed position, from a partially rotated position to an extended position, or a combination thereof. The one or more bias members may connect to a rear of a slide box and pull the slide box towards a closed position. The one or more bias members may be connected to a stop and may push a slide box towards a closed position. The one or more bias members may assist in maintaining the sections in the stored position. The one or more bias members may act as a stop so that the slide boxes are prevented from being removed from the track, the hinge housing, or both. Each slide box may be connected to a bias device. The bias devices may be a spring, an elastic material, rubber, a compression spring, an expansion spring, a split washer, or a combination thereof. The bias devices may be free of power to operate. For example, the bias devices may store kinetic energy and release the kinetic energy to move the sections. The bias device may assist in moving the sections (e.g., the bias device may not be sufficiently strong to independently move the sections). The bias device may be powered to move the sections between positions. The bias device may be a motor that moves the sections upon power being applied to the motor. The sections may be free of bias devices. There may be a plurality of bias devices. Each slide box may be connected to multiple bias devices. For example, a first bias device may act as a stop and a second bias device may move the slide box.

The slide box may function to allow two sections to move relative longitudinally relative to each other to separate an anti-rotation joint. The slide box may allow a section to move so that an anti-rotation joint does not prevent rotational movement of one section relative to another section. The slide box may slide relative to the hinge housing, the track, or both. The slide box may be fully or partially located within the hinge housing, the track, or both. The slide box may move along a longitudinal axis of a tonneau section. One or more slide boxes may be connected to each section. Preferably, a plurality of slide boxes are connected to each section. The slide boxes may connect to one or more hinge arms, one or more hinge pins, or both. The slide boxes may be generally cube shaped or cuboid shaped. The slide boxes may have a cross-sectional shape that is generally square, rectangular, concave, convex, or a combination thereof. The slide boxes may include a pin guide that allows a portion of a hinge arm to move relative to the slide box, as the slide box moves, the hinge arms move, or both. The slide box may connect the hinge to the hinge housing, the tonneau section or both. The slide box may allow for longitudinal reorientation of the tonneau sections relative to each other without rotational movement of the tonneau sections relative to each other. The slide boxes may assist in disengaging the anti-rotation joints. The slide boxes may include one or more projections, recesses, pin guides, pin locks, or a combination thereof.

The one or more projections may function to hold the slide box within a hinge housing. The one or more projections may connect the slide box to a track but allow the slide box to longitudinally move along the track without being laterally movable, vertically movable, or both. The one or more projections may extend outward from a midpoint of the slide box or away from an opposing wall. The one or more projections may extend outward a sufficient distance so that the slide box is not removable from the hinge housing, the projections contact the track recesses, the track projections, or both. The slide box may include a plurality of projections. The slide box may include a projection on each side. The slide box may include two projections on each side. The projections may be located on the top, bottom, center, a top region, a bottom region, or a combination thereof of a wall of a slide box. The one or more projections may mirror the shape of the track recess. The one or more projections may be complementary in shape to the track recess. The one or more projections may be formed with the slide box. For example the projection may be stamped into the slide box. The one or more projections may be added to the slide box. For example, the projections may be connected to a slide box via welding, a fastener, or some other attachment method. The projections may be formed by a recess being formed into the slide box.

The one or more recesses may function to contact a portion of a track, a hinge housing, or both and restrict lateral movement, vertical movement (i.e., in a direction normal to a surface of the tonneau section), or both. The one or more recesses may contact a track projection. The one or more recesses may be concave to receive a track projection. The one or more recesses may be a concave feature that extends inward so that projections are formed. The one or more recesses may be integrally formed in the slide box. For example, the slide box may be stamped, presses, molded, extruded, or a combination thereof so that the recess is formed in a side wall. A recess may be formed in one or more side walls. Preferably, a recess is formed in each side wall. The slide box may include a plurality of recesses. The recesses may be connected to one or more pins, one or more pin locks, or both. The one or more recesses may be connected to one or more hinge arms. One or more pins may extend from a recess on a first wall to a recess on a second wall. The recesses may include one or more pin guides.

The one or more pin guides may function to allow a pin, hinge arm, or both to move relative to the slide box while remaining connected to the slide box. The pin guide may function to allow one end of the hinge arm to move relative to the slide box. The one or more pin guides may be a through hole in a wall of the slide box. The one or more pin guides may be generally arcuate in shape. The one or more pin guides may extend in a longitudinal direction, a vertical direction, or both. The one or more pin guides may be a pair of opposing pin guides that receive a common pin that spans the slide box. The one or more pin guides may allow the pins, hinge arms, or both to move as the slide box, the hinge or both moves between the closed position and the extended position, the extended position and the partially rotated position, the partially rotated position and the stored position, the closed position and the stored position, or a combination thereof. The one or more pin guides may control the rotational geometry of one section relative to another section. The shape of the pin guide may determine a rotation, rotational angle, or both of the hinge arms the panels along the hinge arms, or both. The one or more pin guides may restrict movement of the hinge arms so that the hinge arms support a tonneau section relative to another tonneau section creating a gap therebetween. The pin guide may prevent over rotation of the tonneau sections, the hinge arms, or both. One or more pins may bottom out in the pin guide to stop rotation of a tonneau section. The one or more pins may not contact an end of a pin guide. The pin guides and the stops may work together to control movement, rotation, or both of the tonneau sections, hinge arms, or both. Preferably, a length of the pin guide does not control rotation of the tonneau sections, movement of the hinge arms, or both. For example, a length may be selected that is longer than a total travel of a pin in the pin guide so that the pin never contacts an end of a pin guide. The pin guide may have a slope of about 1 or less, about ½ or less, about ¼ or less, about ⅛ or less, or even about 1/16 or less. The pin guide may have a slope of about 1/128 or more or about 1/64 or more. If the pin guide is arcuate, the arc may have a radius of about 1 mm or more, about 3 mm or more, about 5 mm or more, about 1 cm or more, or about 3 cm or more. The pin guide may have a radius of about 10 cm or less, about 7 cm or less, or about 5 cm or less. The pin guides may connect to one or more hinge arm. The pin guides may connect to a plurality of hinge arms. The pin guides may connect to two or more hinge arms. The pin guides may be free of a connection with the hinge arms. The pin guide may receive one end of a hinge arm and an opposing end of a hinge arm may be connected to a pin guide in a second slide box or preferably in a pin lock in the second slide box.

The pin lock may function to restrict movement of one end of a hinge arm. The pin lock may receive a pin that locks one end of a hinge arm to a slide box. The pin lock may be located proximate to the pin guide. The pin lock may be located above, below or in a same plane as a pin guide. The pin lock may allow for rotational movement. The pin lock may prevent longitudinal movement, lateral movement, vertical movement, or a combination thereof of a pin, a hinge arm, or both. The slide box may include a plurality of pin locks. The pin locks may be a through hole. The pin locks may be located in opposing walls of the slide box. The pin locks may connect to one or more hinge arms. The pin locks may connect to half of the hinge arms. The pin locks may be free of connection with half of the hinge arms. A pin lock may extend through one or more of the hinge arms. The pin lock may connect two or more, three or more, four or more, or all of the hinge arms together. The pin locks be located at a midpoint between the slide boxes, the ends of the hinge arms, or both. The pin locks may be located in a central region of the hinge arms. The pin locks may be located both in the hinge arms and the slide boxes.

The hinge arms may function to connect one tonneau section to a second tonneau section. The hinge arms may function to support one tonneau section relative to another tonneau section. The hinge arms may move relative to one or more slide boxes to permit a tonneau section to be moved between a closed position and a stored position. Each hinge may include one or more, two or more, three or more, four or more, or even five or more hinge arms. The hinge arms may include one or more pin recesses (a hole that receives a pin). The pin recesses may be a boss (i.e., a thickened area of the hinge arm relative to the regions around the boss). The hinge arms may be straight. The hinge arms may include one or more bends. The hinge arms may include one or more straight sections. The hinge arms may include one or more angled sections. The hinge arms may include one or more segments that are angled relative to each other. The hinge arms may be generally "C" shaped. The hinge arms may all be mirror images of each other. The hinge arms may be installed in a hinge so that the hinge arms face in opposing directions. The hinge arms may include a fixed end and a movable end.

The fixed end may function to connect to a slide box. The fixed end may be rotational movement relative to the slide box but may be longitudinally, laterally, vertically, or a combination thereof static relative to the slide box. The fixed end may be connected to one other fixed end of a hinge arm. The fixed end may be connected ton one or more hinge pins. The fixed end may be located adjacent to a movable one of one or more hinge arms.

The one or more movable ends function to move relative to a slide box so that an angle of the slide box may vary relative to an opposing slide box as the tonneau sections move relative to one another. The one or more movable ends may longitudinally move, vertically move, or both relative to the slide box. The movable ends may move within a pin guide. The movable ends may move relative to fixed ends of adjacent hinge arms. The movable end may be part of a fixed segment.

The fixed segment functions to connect the hinge arm to the slide box. The fixed segment may include one or more hinge pins, pin recesses, or both. The fixed segment may include two or more hinge pins, pin recesses, or both. The fixed segment may rotate relative to a slide box but the position within the slide box may remain fixed. The fixed segment have one pin recess located in a plane above another pin recess. One pin recess may be located in a center of the fixed segment. One pin recess may be located on a top side of the fixed segment. The fixed segment may include a pivot point. The fixed segment may connect all of the hinge arms together. The fixed segment may include a pin recess that connects all of the segments together, but allows some of the hinge arms to move relative to each other. The fixed segment may extend at an angle relative to the central segment. The angle may be about 90 degrees or more, about 105 degrees or more, or about 115 degrees or more. The angle between the fixed segment and the central segment may be about 160 degrees or less, about 145 degrees or less, or about 135 degrees or less.

The central segment may function to extend from the slide box to another side box. The central segment may connect the fixed segment to the movable segment. There may be one or more central segments. There may be a plurality of central segments. The central segments may include one or more pin recesses. The central segments may be free of a pin recess. The central segment may determine a gap size between a first tonneau segment and a second tonneau segment. The central segment may extends at an angle relative to a movable segment. The angle may be about 75 degrees or more, about 90 degrees or more, or about 105 degrees or more. The angle between the movable segment and the central segment may be about 160 degrees or less, about 145 degrees or less, about 125 degrees or less, or about 115 degrees or less.

The movable segments may function to move relative to the slide box. The movable segments may allow the geometry between the hinge arm and the slide box to change relative to each other. The movable segments may connect the hinge arm to the track recess. The movable segments may include one or more pin recesses. The movable segments may include two or more pin recesses. The movable segments may extend into one of the slide boxes. The movable segments may be located proximate to a fixed segment of one or more adjacent hinge arms. The movable segments may be connected to a slide box via one or more hinge pins.

The one or more hinge pins may function to connect one or more hinge arms to one or more slide boxes, one or more hinge arms, or both. The one or more hinge pins may allow for rotational movement. The one or more hinge arms may prevent longitudinal movement, lateral movement, vertical movement, or a combination thereof. The one or more hinge pins may move with a track recess. The one or more hinge pins may be restricted by a pin lock, a pin recess, or both. The one or more hinge pins may be made of metal, plastic, a polymer, titanium, aluminum, steel, carbon steel, stainless steel, or a combination thereof. The one or more hinge pins may be generally cylindrical. The one or more hinge pins may include one or more recesses that contact and fix to the slide box, the hinge arms, or both. The one or more hinge pins may be press fit into a hinge recess. The one or more hinge pins may be flared once placed into a hinge recess. The one or more hinge pins may rotate or be rotated about as the hinge moves between the various positions such as a closed position, extended position, partially rotated position, stored position, or a combination thereof.

The closed position is a position where two or more adjacent tonneau sections are in contact. The closed position is a position where the anti-rotation joint is in contact. The closed position may be where rotational movement is prevented by the anti-rotation joint. The closed position may be one or more tonneau sections are closed so that fluids, debris, or both are prevented from entering a bed. Preferably, the closed position includes all of the tonneau sections being connected together so that the bed is closed and may be locked. The user in beginning to store the tonneau sections may have to move one or more sections from the closed position to the extended position.

The extended position functions to allow one section to rotate relative to another section. The extended position longitudinally extends one section from another section. The extended position may move one or more slide boxes partially out of one or more hinge housings, along one or more tracks, or both. The extended position may be where the anti-rotation joint is spaced apart so that during rotation of one segment relative to another segment contact does not occur. The extended position may have one section overhanging a rear of a bed, a rear of a truck, or both. The extended position may longitudinally move one segment relative to another segment about 3 mm or more, about 5 mm or more, about 7 mm or more, about 1 cm or more, about 3 cm or more, or about 5 cm or more. The longitudinal movement to the extended position may be about 25 cm or less or about 15 cm or less. Once the section is moved to the extended position the section may be partially rotated or move to a stored position.

The partially rotated position may function to allow one anti-rotation joint to move past another anti-rotation joint as the section is moved towards a stored position. The partially rotated position may have one or more hinge pins that move within a track recess. The partially rotated position may be movement of one section out of plane relative to another section. The partially rotated position may be movement towards a stored position.

The stored position may function to stack up one or more, two or more, or all of the tonneau sections relative to each other so that all or a portion of the bed is open. The stored position may expose all or a portion of the bed. The stored position may have at least two sections overlapping each other. The stored position may have a gap between overlapping tonneau sections. The tonneau sections may move between a closed position and a stored position via a process.

The process may include a plurality of steps. The process may include one or more of the following in virtually any order. Disconnecting a tonneau section from a bed. Longitudinally moving one or more sections of the tonneau system. Rotating one tonneau section vertically relative to another tonneau section. Longitudinally moving one or more subsequent tonneau sections. Rotationally moving one or more tonneau sections. Connecting the tonneau sections to the bed so that the tonneau sections are restrained.

FIG. 1 is a top perspective view of a foldable tonneau system 2 including a plurality of tonneau sections 4. Each of the tonneau sections 4 are separated by a hinge pivot 6 so that each of the tonneau sections 4 are movable relative to each other.

Figure 2:
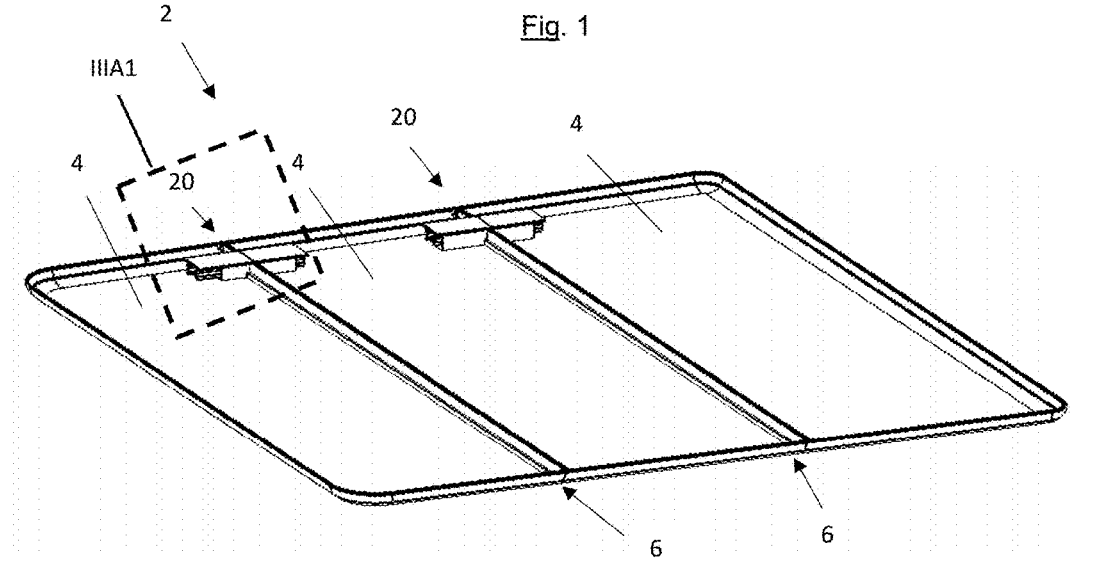
FIG. 2 is a bottom perspective view of a tonneau system in a closed position.

FIG. 2 is a bottom perspective view of the foldable tonneau system 2 and the plurality of tonneau sections 4. A hinge 20 extends over the hinge pivot 6 to connect two of the tonneau sections 4 together.

FIG. 3A1 is a close-up view of the hinge 20 located within Box IIIA1 of FIG. 2. The hinge 20 extends over the hinge pivot 6 to connect two tonneau sections 4 together that are located in a closed position 100. The tonneau sections 4 have an anti-rotation joint 8 that connects the two tonneau sections 4 together when the anti-rotation joints 8 are together, and allow for relative motion of the tonneau sections 4 when the anti-rotation joint 8 is spaced apart.

FIG. 3A2 is a close-up perspective view along the anti-rotation joint 8 of FIG. 3A1 along lines IIIA2. Each of the tonneau sections 4 includes a cheek 10 and shoulder 12. The cheek 10 aligns with the shoulder 12 of the adjacent tonneau section 4.

FIG. 3B1 is a plan view of the bottom with the hinge 20 and tonneau sections 4 in an extended position 110. When in the extended position 110 the slide box 40 moves along the hinge housing 22 so that a gap (G) is formed between two adjacent tonneau sections 4.

FIG. 3B2 is a side view of a hinge 20 and tonneau sections 4 in the extended position 110. The slide boxes 40 move along the hinge housing 22 so that a gap is formed between two adjacent tonneau sections 4. The hinge housing 22 includes a track 24 with a track recess 26 that receives a projection 42 of the slide box 40. Two opposing slide boxes 40 are connected together by hinge arms 60. The hinge arms 60 each include a fixed end 64 and a movable end 66 and hinge pins 62 that form connections with the slide box 40 or adjacent hinge arms 60. The hinge pins 62 in the fixed end 64 of the hinge arms 60 are locked into a pin lock 46 in the slide box 40 so that one end of the hinge arm 60 remains static. An opposing end of the hinge arms 60, which is the movable end 66 includes a hinge pin 62 that moves within a pin guide 44 of the slide box 40. The pin guide 44 assists in controlling movement of the hinge 20 as the hinge 40 and tonneau sections move from the closed position to the stored position.

FIG. 4A is a side view of the foldable tonneau system 2 including a plurality of tonneau sections 4 in a stored position. The hinge 20 includes slide boxes 40 extended longitudinally from the hinge housing 22 with the hinge arms 60 extending between the two opposing slide boxes 40.

FIG. 4A1 is a close-up side view of two tonneau sections 4 in the stored position 120. The hinge arms 60 include hinge pins 62 and form connections with the slide boxes 40. The slide boxes 40 include projections 42 and a recess 48 that fit within and are movably connected to the hinge housings 22 to allow movement of the tonneau sections 4 into the stored position 120.

Figure 4B:
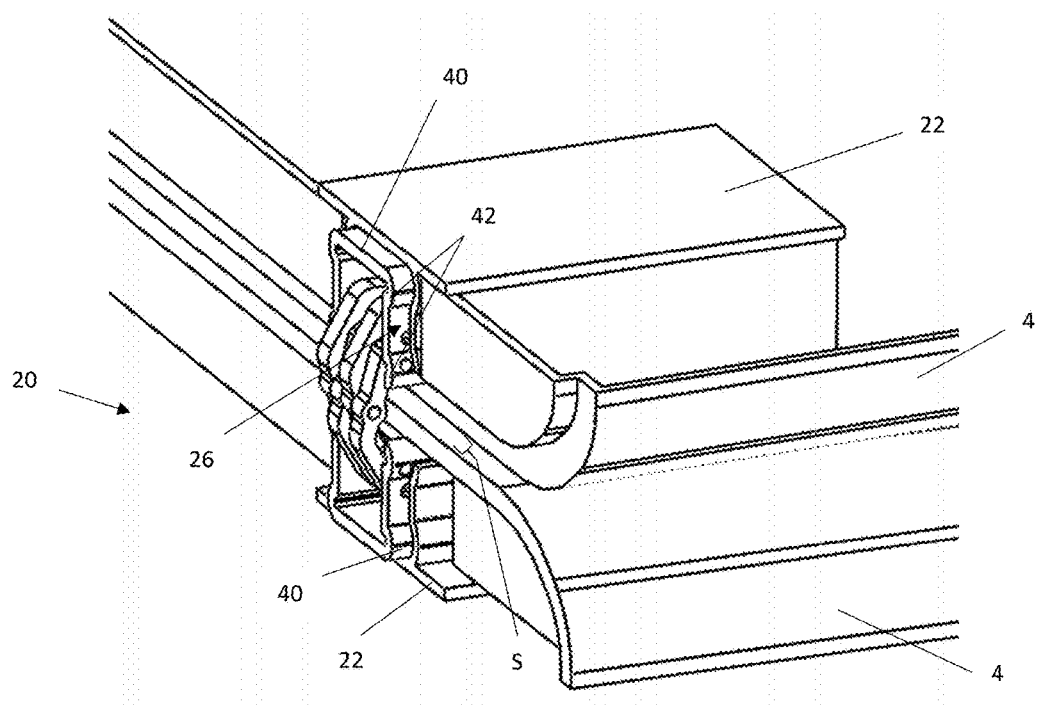
FIG. 4B is a perspective view of a hinge connecting two tonneau sections.

FIG. 4B is an enlarged view of the hinge 20 attached to the tonneau sections 4 by hinge housings 22. The hinge 20 includes a slide box 40 within a hinge housing 22. The hinge housing 22 includes a track recess 26 which receives a projection 42 of the slide box 40. The slide box 40 moves along the hinge housing 22 so that one tonneau section 4 is rotationally pivotable to a location above a second tonneau section 4 creating a space (S) between the two substantially parallel tonneau sections 4 when in a stored position.

Figure 5:
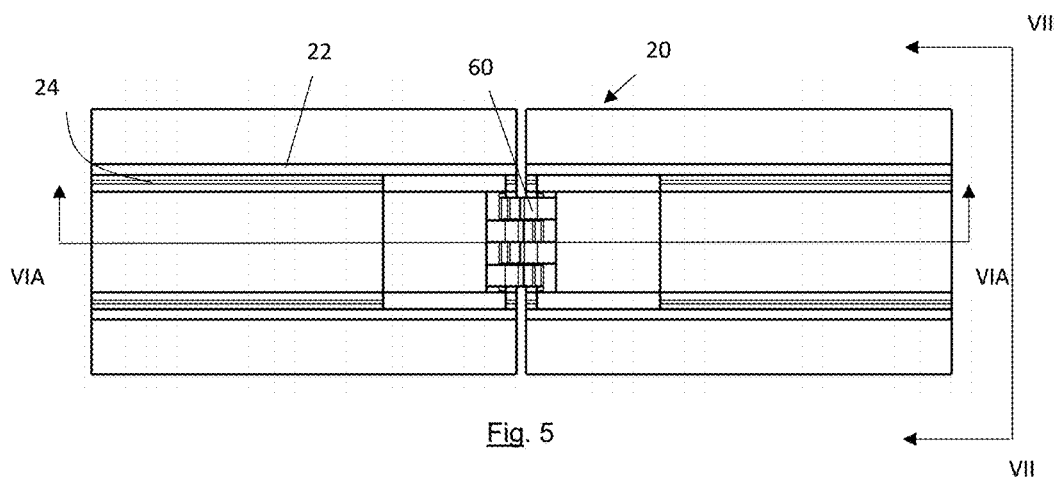
FIG. 5 is a top view of a hinge removed from the tonneau system.

FIG. 5 is a top view of the hinge 20 removed from the tonneau sections (not shown). The hinge 20 includes two hinge housings 22 and two slide boxes 40 that are connected by a plurality of hinge arms 60. The hinge housings 22 include tracks 24 that permit the slide boxes 40 to move relative to the hinge housings 22.

Figure 6A:
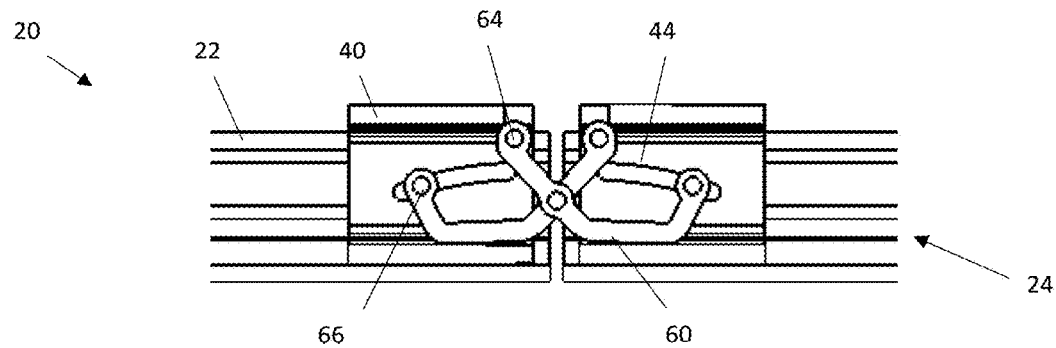
FIG. 6A is a cross-sectional view of the hinge of FIG. 5 along line VIA-VIA.

FIG. 6A is a cross-sectional view of the hinge 20 of FIG. 5 along lines VIA-VIA. As shown each of the hinge arms 60 include a fixed end 64 and a movable end 66. The movable end 66 moves along the pin guide 44 when the slide boxes 40 move along the track 24 of the hinge housing 22.

Figure 6B:
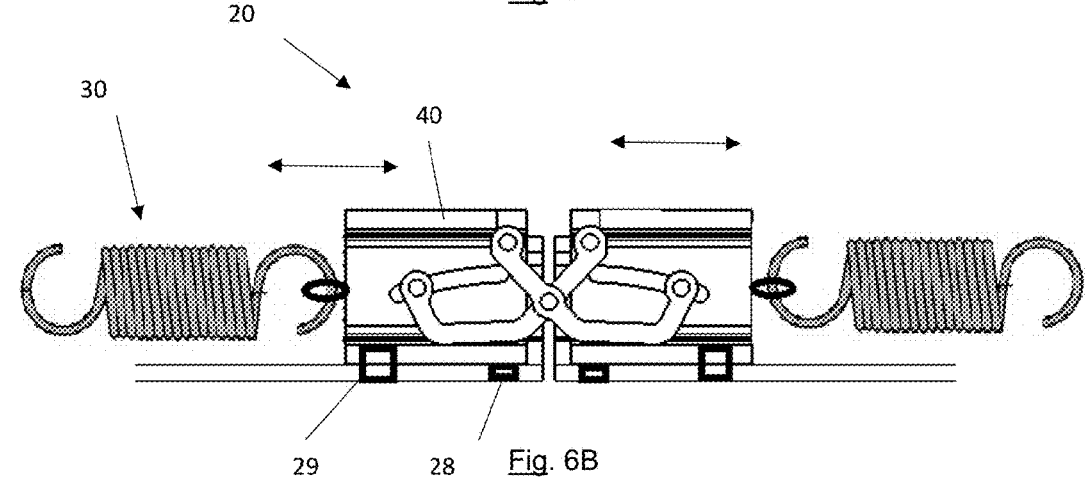
FIG. 6B is a cross-sectional view of a hinge connected to bias members

FIG. 6B illustrates a cross-sectional view of a hinge 20 with each of the slide boxes connected to a bias member 30 that assists in moving the slide boxes 40 into a closed position. The hinge 20 also includes stops 28 and movable stops 29 that prevent the slide boxes 40 from being removed.

Figure 7:
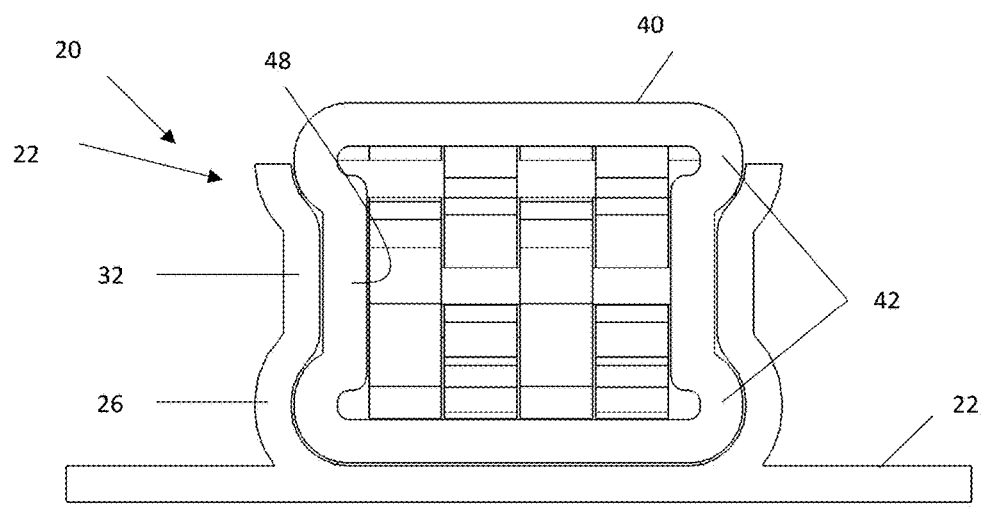
FIG. 7 is an end view of the hinge of FIG. 5 along line VII-VII.

FIG. 7 is an end view of the hinge 20 along lines VII-VII of FIG. 5. The hinge 20 includes a slide box 40 that is located within a hinge housing 22 that connects the hinge to the tonneau sections (not shown). The hinge housing 22 includes a track 24 that includes a track recess 26. The track recess 26 receives a projection 42 and recess 48 that maintains a movable connection between the slide box 40 and the hinge housing 22. A track projection 32 is located proximate to the track recess 26. The track projection 32 extends into a recess 48 in the slide box 40

Figure 8A:
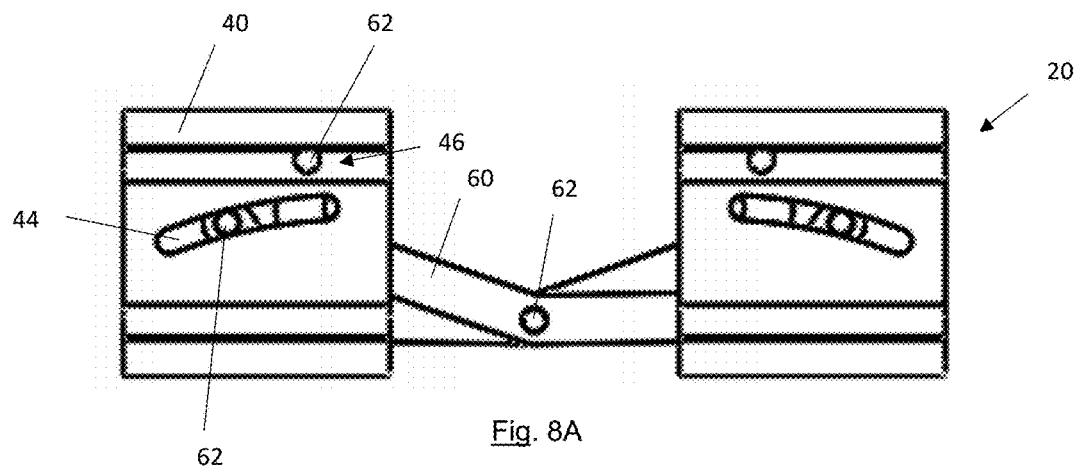
FIG. 8A is a side view of a hinge.

FIG. 8A is a side view of the hinge 20. The hinge arms 60 connect two opposing slide boxes 40 together. The hinge pins 62 of the hinge arms 60 form connections with the slide box 40 or adjacent hinge arms 60. The hinge pins 62 are movable along a pin guide 44 and lockable into a pin lock 46 of the slide box 40.

Figure 8B:
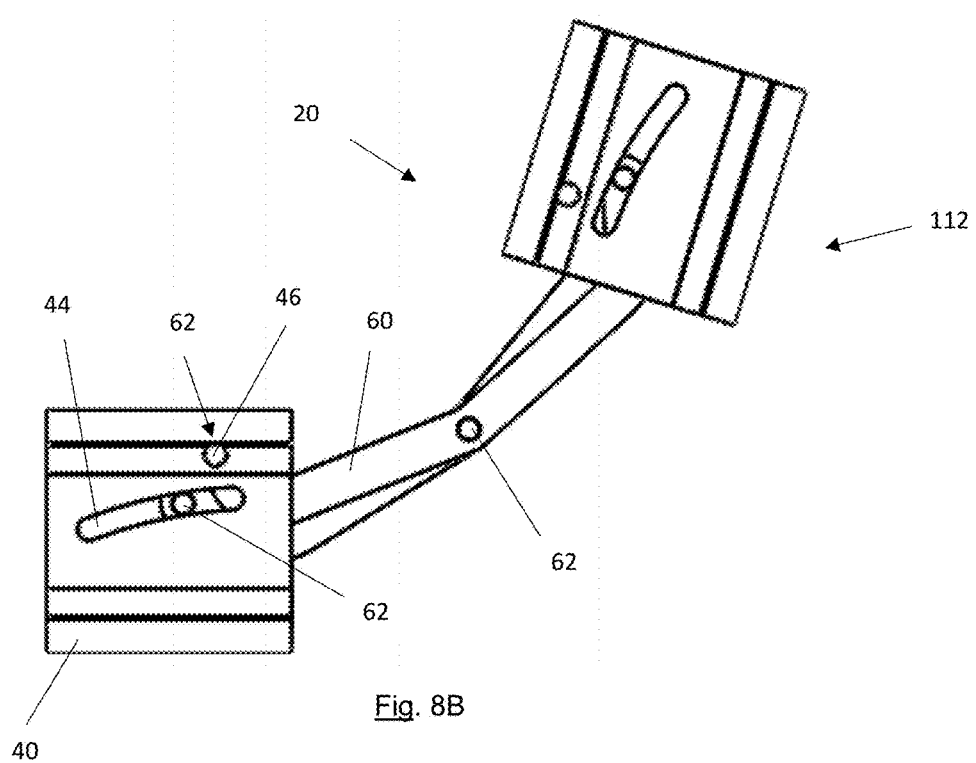
FIG. 8B is a side view of the hinge of FIG. 8A in a partially rotated position.

FIG. 8B is a side view of the hinge 20 in the partially rotated position 112. The hinge arms 60 include hinge pins 62 that form connections with the slide box 40 or adjacent hinge arms 60. The hinge pins 62 move along a pin guide 44 as the hinge 20 and tonneau sections (not shown) move to the partially rotated position 112. The hinge pins 62 of the opposing end are locked into a pin lock 46 in the slide box 40 such that one end of the hinge arm 60 remains static.

Figure 8C:
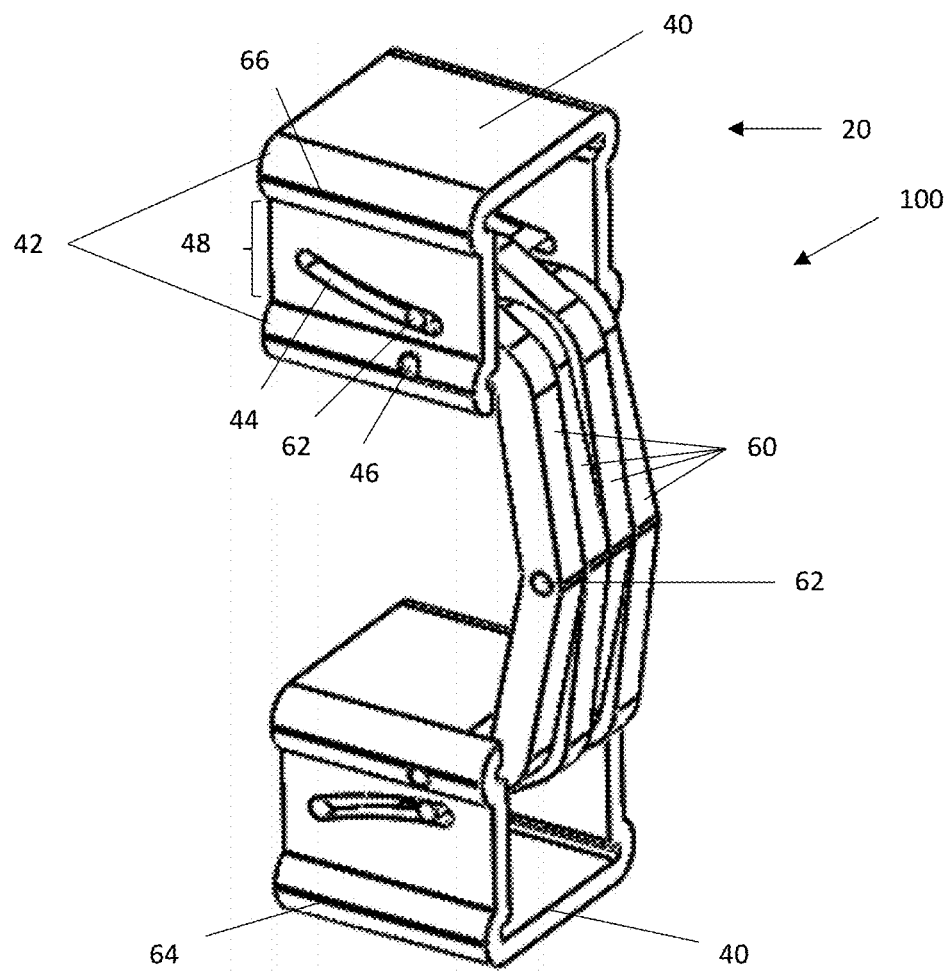
FIG. 8C is a perspective view of a hinge in a stored position.

FIG. 8C is a side view of the hinge 20 in a closed position 100. The hinge arms 60 include a fixed end 64 and a movable end 66. The hinge pins 62 of the fixed end 64 are locked into a pin lock 46 in the slide box 40 such that the hinge arm 60 is stationary. The hinge pins 62 of the movable end 66 move along a pin guide 44 of the slide box 40 as the hinge 20 moves to the closed position 100. The projections 42 and recess 48 of the slide box 40 fit within and are movable along the track of the hinge housing (not shown) of the hinge 20 in order to permit the rotation of the tonneau sections (not shown) above each other in a parallel plane.

Figure 9A:
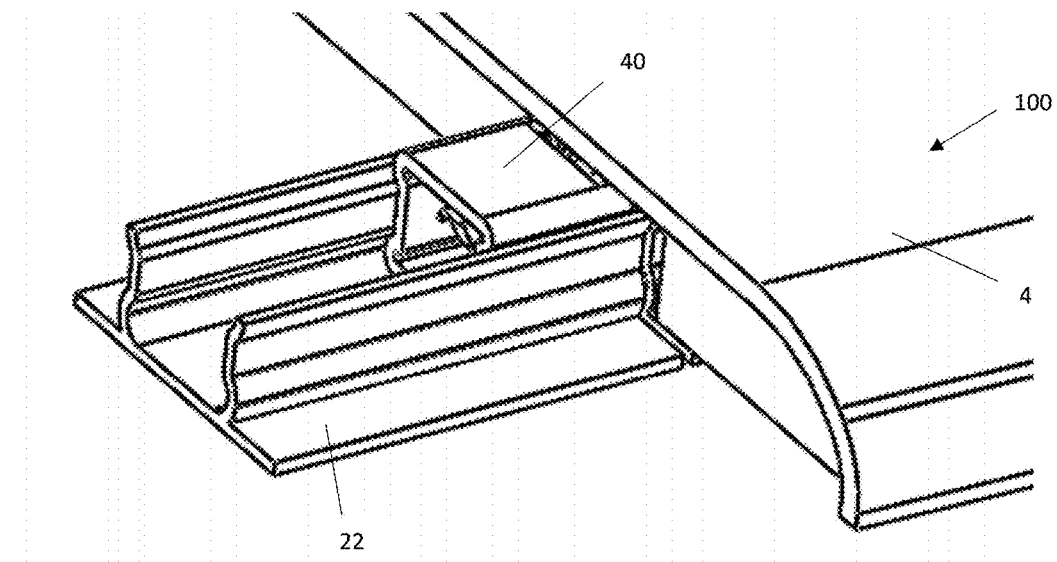
FIG. 9A is a perspective view of a tonneau system in a closed position with one tonneau section removed so that the hinge is visible.

FIG. 9A illustrates a partial view of two hinge housings 22 and one slide box 40 in the closed position 100. One slide box 40 is located within and movably connected to one hinge housing 22. The hinge housing 22 of the second slide box (not shown) is attached to the tonneau section 4. The hinge housings 22 and slide boxes 40 are hidden from view by the tonneau sections 4 (one shown) when in the closed position 100.

Figure 9B:
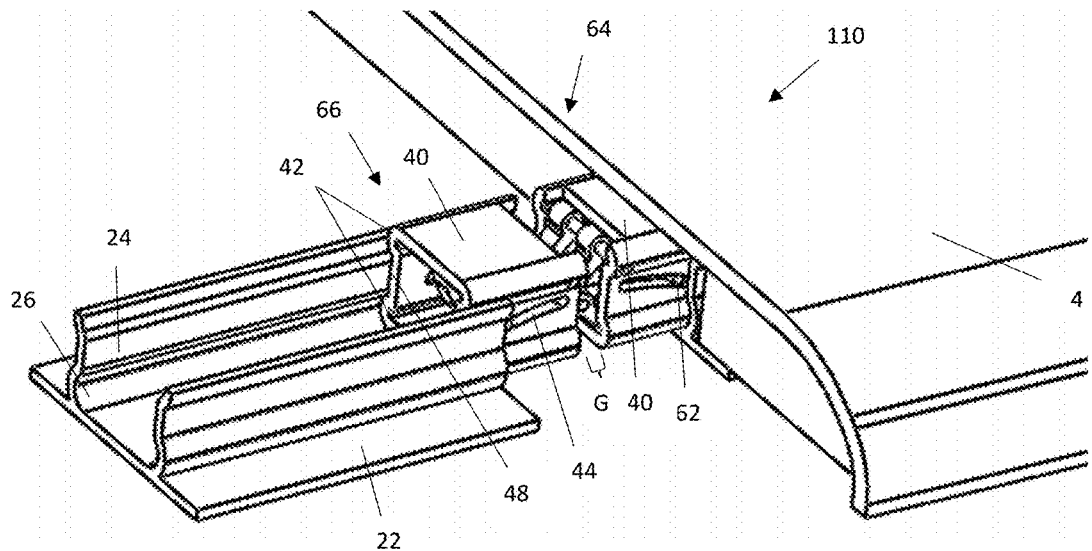
FIG. 9B is a perspective view of a tonneau system of FIG. 9A in an extended position.

FIG. 9B illustrates two hinge housings 22 and two slide boxes 40 in the extended position 110. The slide boxes 40 are located partially within and are longitudinally extended from the hinge housings 22. The hinge housing 22 includes a track 24 with a track recess 26 that receives the projections 42 and the recess 48 of the slide box 40. This permits the slide box 40 to move along the hinge housing 22 and when in the extended position 110, a gap (G) is formed between the two adjacent tonneau sections 4 (one not shown). The two opposing slide boxes are connected together by hinge arms 60 via hinge pins 62 that form connections with the slide box 40 and adjacent hinge arms 60. The hinge arms 60 include a fixed end 64 and a movable end 66. The hinge pins 62 in the fixed end 64 are locked causing the hinge arm 60 at the fixed end 64 to remain stationary. The hinge pins 62 in the movable end 66 move within a pin guide 44 of the slide box 40. The pin guide 44 controls the movement of the tonneau sections 4 into the extended position 110.

Figure 9C:
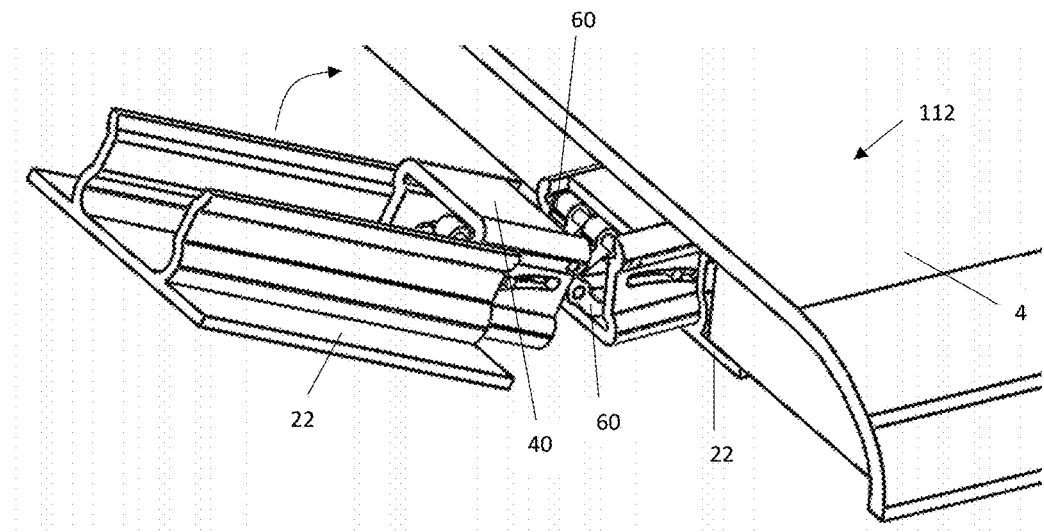
FIG. 9C is a perspective view of a tonneau system of FIG. 9A in a partially rotated position.

FIG. 9C illustrates the hinge housing 22 and the slide box 40 in the partially rotated position 112. The slide box 40 is located partially within and is movable along the hinge housing 22. A plurality of hinge arms 60 connect two opposing slide boxes 40 together and control the movement of the tonneau section 4 into the partially rotated position 112.

Figure 9D:
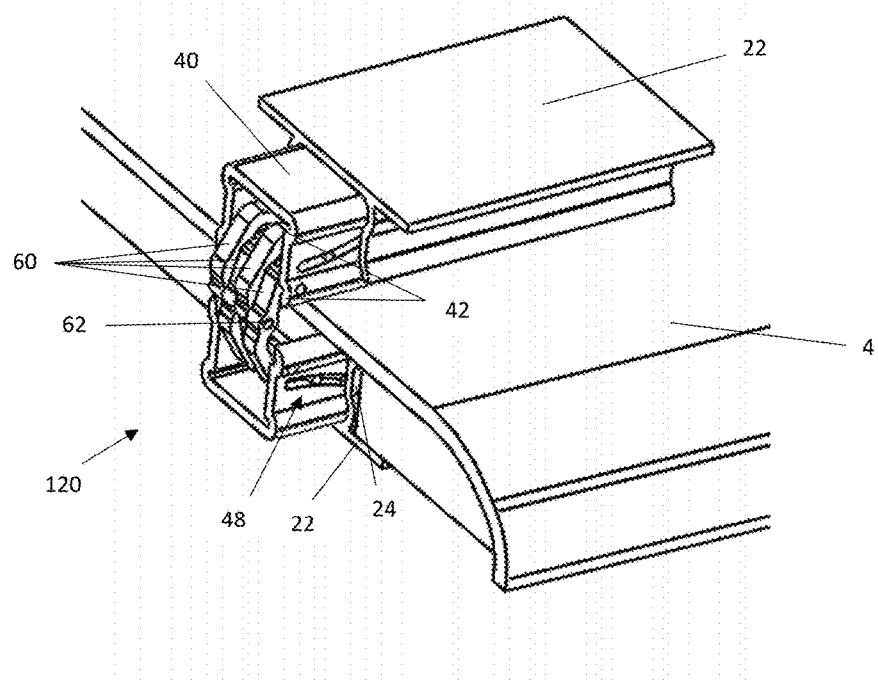
FIG. 9D is a perspective view of a tonneau system of FIG. 9A in a stored position.

FIG. 9D illustrates two hinge housings 22 and two slide boxes 40 in the stored position 120. The slide boxes 40 are located partially within and are longitudinally extended from the hinge housings 22. The slide boxes 40 include a recess 48 that fits within the track 24 of the hinge housing 22 to permit the slide boxes 40 to move in a longitudinal direction relative to the hinge housings 22. Two opposing slide boxes 40 are connected together by hinge arms 60. The hinge pins 62 of the hinge arms 60 form connections with the slide boxes 40 and with the adjacent hinge arms 60. The hinge arms 60 are in an extended position and the hinge housings 22 are rotationally movable which allow one tonneau section 4 to move to a location above and substantially parallel to a second tonneau section (not shown).

Figure 10:
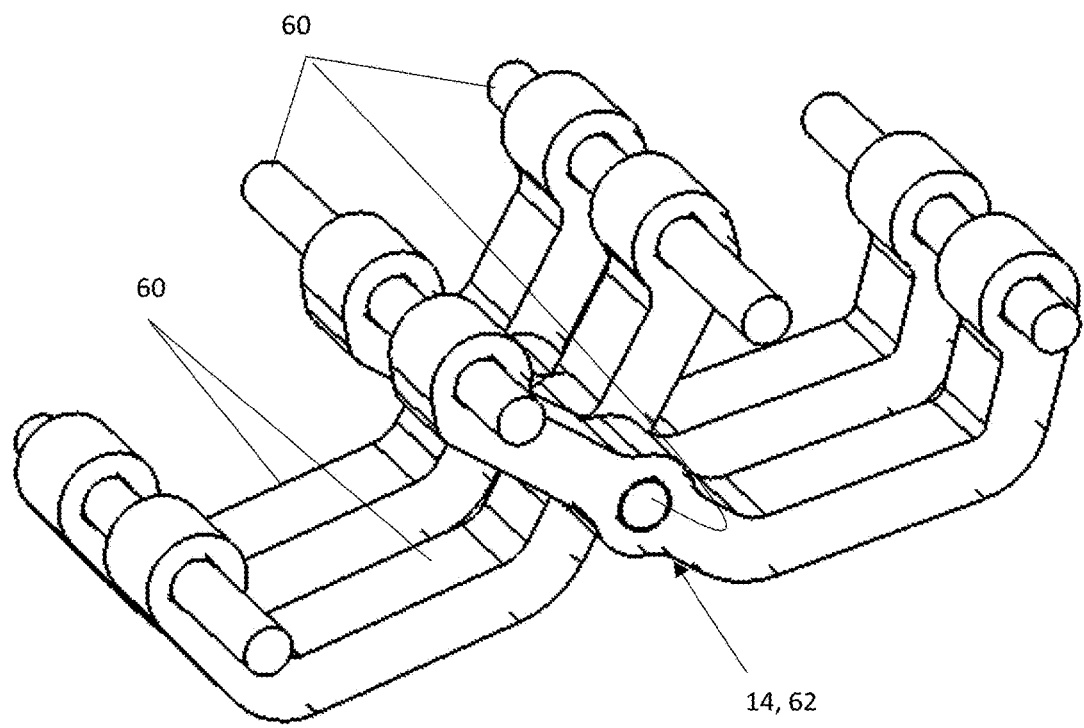
FIG. 10 is a perspective view of the hinge arms connected together via pins.

FIG. 10 is a perspective view of the hinge arms 60 with the slide box removed. As shown, there are four hinge arms 60, all of which are connected together via a hinge pin 62 that extends through a pivot point 14 so that two of the hinge arms 60 are movable relative to two other hinge arms 60. Two hinge arms 60 are connected to each other at both ends via pins 62 and are free of connection with the other two hinge arms 60.

Figure 11:
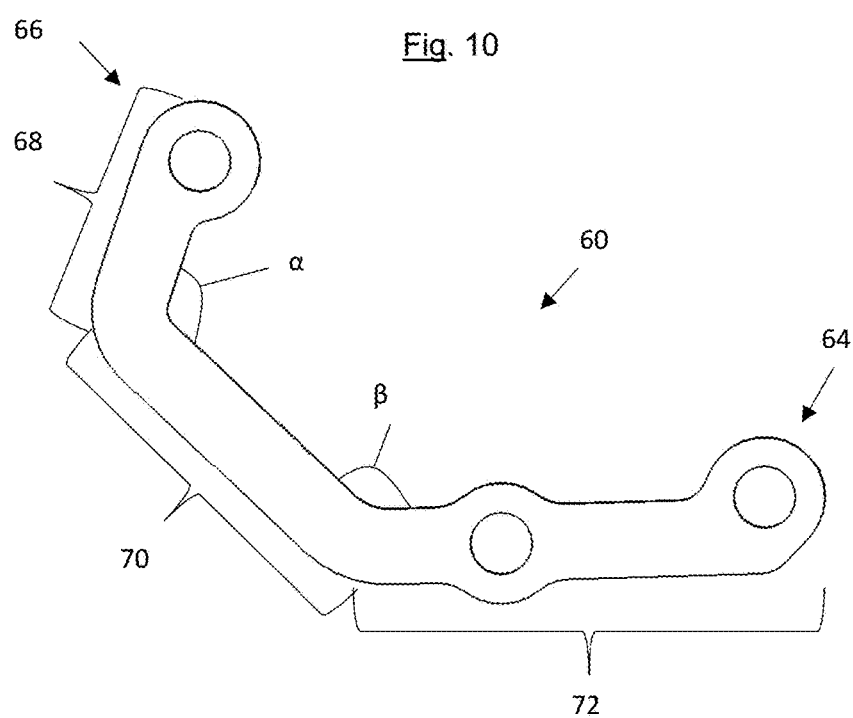
FIG. 11 is a side view of a hinge arm.

FIG. 11 is a side view of a hinge arm 60. The hinge arm 60 includes a fixed end 64 and a movable end 66. The hinge arm 60 includes a plurality of segments. Beginning at the movable end 66 there is a movable segment 68, then a central segment 70, and a fixed segment 73. The movable segment 68 extends at an angle ($\alpha$) relative to the central segment 70. The central segment 70 extends at an angle ($\beta$) relative to a fixed segment 72.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Foldable Tonneau System
4 Tonneau Section
6 Hinge; pivot
8 Anti-rotation Joint
10 Cheek
12 shoulder
14 Pivot point
20 Hinge
22 Hinge Housing
24 Track
26 Track recess
28 Stop
29 Movable stop
30 Bias Member 32 Track projection
40 Slide Box
42 projection
44 Pin guide
46 Pin Lock
48 Recess
60 Hinge Arm
62 Hinge Pin
64 Fixed end
66 Movable end
68 Movable segment
70 Central segment
72 Fixed segment
100 Closed position
110 Extended position
112 Partially Rotated Position
120 Stored position

What is claimed is:

1. A foldable tonneau system comprising:
   a. a plurality of tonneau sections;
   b. one or more hinges connecting two or more of the plurality of tonneau sections together, the one or more hinges each including:
      i. a hinge housing connected to each of the two or more of the plurality of tonneau sections with each of the hinge housings being connected a different one of the plurality of tonneau sections, and
      ii. a slide box located at least partially within and movably connected to each of the hinge housings;
   wherein each of the slide boxes are longitudinally movable relative to the hinge housings so that the one or more hinges are longitudinally extendable, and the hinge housings are rotationally movable relative to each other so that one of the plurality of tonneau sections is rotationally movable to a location above a second one of the plurality of tonneau sections.

2. The foldable tonneau system of claim 1, wherein the hinge housing includes a track and the slide box moves along the track when moving between a closed position and an extended position.

3. The foldable tonneau system of claim 2, wherein the slide box includes one or more projections that fit within a track recess in the track so that longitudinal movement is allowed but movement in other directions is prevented.

4. The foldable tonneau system of claim 2, wherein one or more stops are located within the track that stop the slide box when the slide box reaches the closed position, the extended position, or both.

5. The foldable tonneau system of claim 4, wherein the one or more stops are a lock that prevent the slide box from moving relative to the hinge housing without an external force being applied to the one or more hinges.

6. The foldable tonneau system of claim 4, wherein the one or more stops are a detent that restricts movement of the slide box relative to the hinge housing.

7. The foldable tonneau system of claim 1, wherein the slide box is connected to a bias device that assists in moving the slide box to the closed position, the extended position, or both.

8. The foldable tonneau system of claim 1, wherein a first of the slide boxes is connected to a first of the two or more of the plurality of tonneau sections and a second of the slide boxes is connected to a second of the two or more of the plurality of tonneau sections and one or more hinge arms extend between the first of the slide boxes and the second of the slide boxes.

9. The foldable tonneau system of claim 8, wherein each of the one or more hinge arms include a fixed end and a movable end.

10. The foldable tonneau system of claim 9, wherein the movable end moves within a pin guide within the slide box as the one or more hinges move between a closed position and an extended position or between an extended position and a stored position.

11. The foldable tonneau system of claim 1, wherein the one or more hinges separate the two or more of the plurality of tonneau sections when the one or more hinges are in a stored position.

12. The foldable tonneau system of claim 1, wherein the one or more hinges are completely hidden from view under the plurality of tonneau sections when the one or more hinges are in a closed position.

13. A foldable tonneau system comprising:
   a. two or more tonneau sections that when in a closed position are substantially entirely located within a single plane and are end to end, wherein a first end of a first of the two or more tonneau sections includes a portion of an anti-rotation joint and a second end of a second of the two or more tonneau sections includes a portion of an anti-rotation joint and when the first end and the second end are connected together in the closed position, the anti-rotation joint is complete and prevents movement of the first of the two or more tonneau section and the second of the two or more tonneau sections out of the single plane; and
   b. one or more hinges that connect the two or more tonneau sections together;
   wherein the one or more hinges are longitudinally movable from the closed position to an extended position where the first end and the second end are longitudinally spaced apart so that the first of the two or more tonneau section and the second of the two or more tonneau sections are movable relative to each other out of the single plane.

14. The foldable tonneau system of claim 13, wherein the portion of the anti-rotation joint in the first end and the portion of the anti-rotation joint in the second end each include one or more cheeks and one or more shoulders, where the one or more cheeks in the first end fit into the one or more shoulders in the second end and the one or more cheeks in the second end fit into the one or more shoulders in the first end when the two or more tonneau sections are in the closed position.

15. The foldable tonneau system of claim 13, wherein the one or more hinges include a first half and a second half and each of the first half and the second half include a hinge housing movably connected to a slide box that is longitudinally extendable from the hinge housing.

16. The foldable tonneau system of claim 13, wherein the second of the two or more tonneau sections is rotatably movable to a location over the first of the two or more tonneau sections when the foldable tonneau section is moved from an extended position to a closed position.

17. A method comprising:
   a. moving a first tonneau section away from a second tonneau section within a plane of the first tonneau section and the second tonneau section so that a portion of a hinge extends out of the first tonneau section, the second tonneau section, or both forming a gap between the first tonneau section and the second tonneau section; and b. rotating the first tonneau section relative to the second tonneau section so that the first tonneau section is rotated out of a plane of the second tonneau section.

18. The method of claim 17, wherein the first tonneau section is rotated over the second tonneau.

19. The method of claim 17, wherein the first tonneau section and the second tonneau section are connected together by one or more hinges.

20. The method of claim 19, wherein the one or more hinges include a hinge housing and a slide box and the slide box moves within the hinge housing so that the first tonneau section is movable relative to the second tonneau section.

\* \* \* \* \*